(No Model.)

C. MAISEL & L. M. FISHER.
Preparation of Boned Hams and Shoulders.

No. 234,308. Patented Nov. 9, 1880.

Witnesses:
Michael J. Stark,
George J. Straub.

Inventors:
Conrad Maisel,
Louis M. Fisher,
by Michael J. Stark,
Attorney.

United States Patent Office.

CONRAD MAISEL AND LOUIS M. FISHER, OF BUFFALO, NEW YORK.

PREPARATION OF BONED HAMS AND SHOULDERS.

SPECIFICATION forming part of Letters Patent No. 234,308, dated November 9, 1880.

Application filed September 7, 1880. (No specimens.)

*To all whom it may concern:*

Be it known that we, CONRAD MAISEL and LOUIS M. FISHER, both of Buffalo, Erie county, New York, have jointly invented certain new and useful Improvements on the Preparation of Boned Hams and Shoulders; and we do hereby declare that the following description of our said invention, taken in connection with the accompanying sheet of drawings, forms a full, clear, and exact specification, which will enable others skilled in the art to which it appertains to make and use the same.

This invention has general reference to the preparation of pork, hams, and shoulders; and it consists, essentially, in the peculiar method and means for preparing said hams, &c., as hereinafter first fully set forth and described, and then pointed out in the claims.

Heretofore hams and shoulders have been prepared by first removing the bone, and then tightly binding the same with strings or cord, said strings being passed through the fatty portion underneath the rind. This method is objectionable for various obvious reasons, the principal one of which is, that the cord or string has deteriorating effects upon the ham, &c.

In describing our invention and ascertaining the best method in which it is carried into effect we shall refer to the drawings already mentioned, in which—

Figure 1:
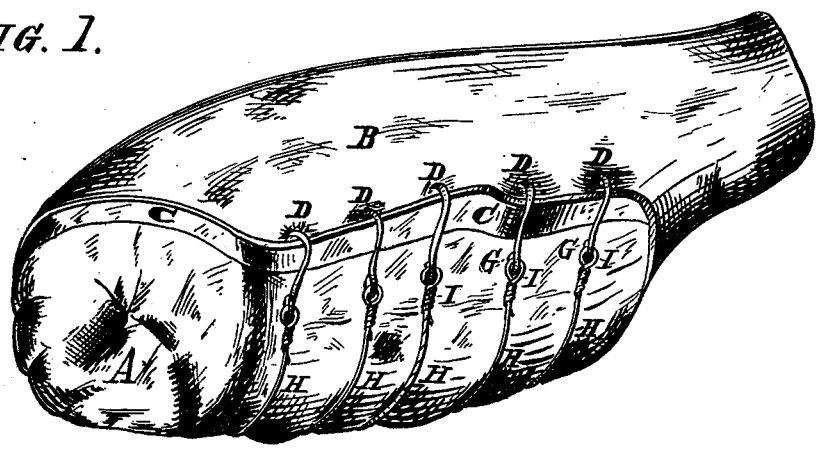
Figure 2:
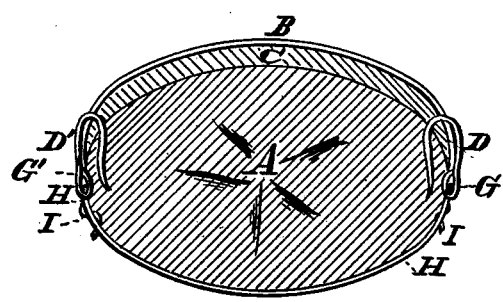

Figure 1 is a perspective view of a prepared ham or shoulder. Fig. 2 is a transverse sectional elevation, and Fig. 3 a plan of the hooks employed in the preparation of hams and shoulders.

In these drawings, the letter A designates the lean and principal portion of a ham or shoulder, having the rind B, as clearly indicated. This ham or shoulder we prepare by first removing the bone in any suitable manner. We then lift the rind B, so as to obtain access to the fat C, and remove so much of the latter as is desired to render the ham or shoulder suitable for the market, it being a well-known fact that all hams and shoulders are fatter than the consumers like to have them. Having so far proceeded, we replace the rind and then compress the ham or shoulder by passing metallic hooks D (shown in detail in Fig. 3) through the rind and fatty portion C into the meat A, in such manner that eyes G, formed on said hooks, may be readily provided with cords or strings H, tied to said eyes at I, and then drawing said strings as tight as possible over the meat portion A and tying the same in the eyes G' of the hooks D' opposite those to which said cords H were first attached, after which the ham or shoulder may be covered with cloth, in the usual manner, and thus be ready for the market.

Figure 3:
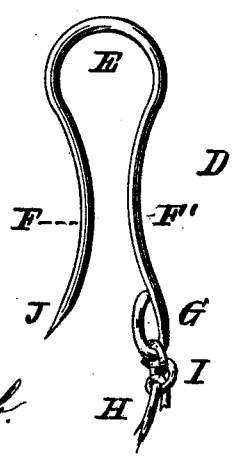

In drawing the cords H tight the tendency will be to draw the part F', Fig. 3, toward the tine F, and thereby to impinge upon the meat between said parts F F' with such force as to prevent either the hook from being withdrawn or the rind from being torn below the part punctured by the hook.

By proceeding in the manner indicated we have succeeded in producing hams and shoulders that will keep for any length of time without deteriorating, especially so when care is taken to employ for the hooks metal covered with such substances as are not affected by the meat and salts contained therein.

Having thus fully described our invention, we claim as new and desire to secure to us by Letters Patent of the United States—

1. The method of preparing hams and shoulders for the market, which consists, essentially, in first removing the bone, then lifting the rind, then removing the surplus fat, then replacing said rind, then inserting hooks on both sides through the rind and fatty portion into the lean meat, then attaching cords to the eyes of one portion of said hooks, and finally drawing said cords over the lean meat and fixing the same to the remaining eyes of said hooks, all as described.

2. A prepared ham or shoulder having the bone and part of its fat removed by lifting and replacing the rind, said shoulder or ham being provided on both sides with hooks D, having eyes G, to which cords H are affixed, the cords passing from one side of the meat to the opposite side without passing over or under the rind, substantially as shown and described.

In testimony that we claim the foregoing as our invention we have hereto set our hands in the presence of two subscribing witnesses.

CONRAD MAISEL.
     LOUIS M. FISHER.

Attest:
 MICHAEL J. STARK,
 GEORGE J. STRAUB.